2,955,049

METHOD OF MAKING A CELLULAR GLASS PRODUCT

Alfred E. Booth, East Hempfield Township, Lancaster County, Pa., assignor to Armstrong Cork Company, Lancaster, Pa., a corporation of Pennsylvania No Drawing. Filed Feb. 25, 1959, Ser. No. 795,327

6 Claims. (Cl. 106—40)

This invention relates to a method of making porous or cellular products from powdered glass. It is concerned more particularly with the production of thermal and sound absorbing insulation materials.

Cellular glass products as now commercially produced utilize carbonaceous materials, such as carbon black, and an oxidizing agent as a gas-producing component. Upon firing of a batch of powdered glass with this type of gas-producing agent, the carbon is oxidized to CO and $CO_2$ and other gases may be liberated from the oxidizing agent. These gases which are released into the softened glass cause the mass to sponge or foam, and a porous or cellular mass is created upon solidification of the glass.

An object of the present invention is to provide a process of making porous or cellular products from powdered glass with control of foaming or cellulation by utilization of a mixture of sodium nitrate and sodium hydroxide as a fluxing and gassing agent.

Another object of the invention is to provide a process of making porous or cellular products from powdered glass which will be white or of light color as contrasted with the black or dark colored products produced by the carbon process now in commercial production.

Other objects of the invention will be clear from consideration of the following detailed description of the invention.

According to the invention, a silicate glass, such as conventional soda-lime glass, customarily used in container manufacture and readily available as low-cost cullet, a heat resisting borosilicate type glass which is used in the preparation of glass baking ware, laboratory glassware, and light bulbs and available also as cullet, or mixtures of these, is ground to a powder. With this powder is mixed sodium nitrate and sodium hydroxide, preferably with water adequate to moisten the glass powder. The batch thus formed is dried and then is fired at a temperature which fluxes and softens the glass batch and simultaneously releases gas from the fluxing and gassing agent into the softened glass batch for the formation of pores or cells in the softened glass batch. The firing is continued until the gas released into the softened glass batch (a foaming or sponging action) produces a porous or cellular product of the desired density. The product is stabilized and then is annealed by controlled cooling.

The following examples illustrate specific embodiments of the invention:

Example I 150 parts of soda-lime glass (this may be obtained as cullet from a glass container manufacturing plant) are ground to a fine powder in a ball mill or hammer mill. The size of the particles should be as small as economically feasible, with particles in the range of minus 100 mesh or lower being preferred. 21.3 parts by weight of a mixture of 11.0 parts by weight of sodium nitrate and 10.3 parts by weight of sodium hydroxide are dissolved in about 20 parts by weight of water.

The mixture of sodium nitrate and sodium hydroxide represents about an 8% alkali ($Na_2O$) addition to the glass, based on the weight of the glass, and the mixture is in a 1:2 mol ratio of sodium nitrate to sodium hydroxide.

The solution thus prepared is mixed with the powdered glass which it moistens. The mass then is dried and about 3.5 pounds of it are spread as a substantially uniform layer over the bottom of a stainless steel pan having a bottom about 12″ x 12″ and side walls about 4″ high. This provides a layer of material about ½″ thick which is adequate upon expansion to produce a 4″ thick slab of finished material.

The mass then is delivered into a zone heated furnace where it is first preheated to about 1200° F. for about 30 minutes and then is transferred to a firing zone where it is fired at a temperature of about 1500° F. for about 30 minutes or until a slab roughly 4″ thick has been formed. The fired mass then is passed into a stabilizing zone heated to about 1200° F. where it is held for about 30 minutes to minimize shrinkage and collapse of the cell walls. It then is passed into a cooling zone where the temperature of the mass is cooled to about 1000° F. in 30 minutes.

The mass now is removed from the furnace and stripped from the pan and placed in an annealing furnace where the temperature is about 850° F. at the start of the annealing operation but is gradually reduced to about 200° F. to 300° F. in about twelve to fourteen hours.

The product produced in accordance with Example I was essentially white and had a density in the order of 10 pounds per cubic foot and a crushing strength in the order of 250 pounds per square inch. Such a product may be fabricated into a thermal insulation block, sound absorbing tile, pipe covering section, or other article. The pores or cells formed in the product were small and of substantially uniform size. Air permeability tests which were made indicated that the product contained about 50% closed cells and the remaining cells were open or intercommunicating and may be designated as pores.

The fluxing and gassing action may be explained as follows: During firing, the sodium hydroxide of the fluxing and gassing agent reacts with and fluxes the glass. The sodium hydroxide probably undergoes a change represented as follows:

$$2NaOH \rightarrow Na_2O + H_2O$$

The $Na_2O$ chemically becomes a part of the glass matrix, forming a complex chemical structure, and at the elevated temperature of firing, the water is evolved as a gas. The sodium hydroxide does not simply decompose or volatilize, for it is well known that sodium hydroxide when heated alone boils at a temperature above 2500° F. and is volatilized as gaseous sodium hydroxide, but this temperature is not reached during firing in the present process.

Also, during firing, the sodium nitrate of the fluxing and gassing agent decomposes, for it is known that sodium nitrate starts to decompose at about 715° F. But complete decomposition does not occur instantaneously. Consequently, decomposition continues as the firing of the mass proceeds. When sodium nitrate decomposes, it probably proceeds generally as follows:

$$2NaNO_3 \rightarrow Na_2O + 2NO_2 + O_2$$

During firing, the reaction between the sodium hydroxide and the glass serves to flux and soften the glass at the firing temperature and thus enables efficient trapping of the gaseous products yielded from the sodium nitrate upon its decomposition.

As firing continues, there is probably some reaction of the Na$_2$O from the sodium nitrate with the softened glass and this too is chemically bound into the glass matrix. The nitric oxide and oxygen which are liberated upon the gradual decomposition of the sodium nitrate serve to cellulate the softened glass, forming pores or cells therein.

There is evidence also pointing to a reaction between the sodium nitrate and the sodium hydroxide. It is known from the fusion diagram of the system NaOH. NaNO$_3$, that definite chemical compounds are formed at 2:1 and 1:1 mol ratios of sodium hydroxide to sodium nitrate. Whether such compounds are formed during firing of the batch is not now known. It is possible that the sodium hydroxide-sodium nitrate reaction product which is formed has a higher decomposition temperature than that of sodium nitrate. This would account for the unusual release of gas into the batch at temperatures far exceeding the decomposition temperature of sodium nitrate. Regardless of theory, however, it has been found that the results achieved with the combination of sodium nitrate and sodium hydroxide are substantially different from those obtained by the use of either sodium nitrate or sodium hydroxide alone.

*Example II*

75 parts of soda-lime glass and 75 parts of borosilicate glass are ground to a fine powder in a ball mill or hammer mill as in Example I. 9.1 parts by weight of a mixture of 6.2 parts by weight of sodium nitrate and 2.9 parts by weight of sodium hydroxide are dissolved in about 10 parts by weight of water.

This represents about a 3% alkali or Na$_2$O addition to the glass, based on the weight of the glass, and the mixture is in a 1:1 mol ratio of sodium nitrate to sodium hydroxide.

This solution of fluxing and gassing agent is mixed with the powdered glass and serves to moisten it. The mass is dried and about 3½ pounds of it are spread as a substantially uniform layer over the bottom of a stainless steel pan having a bottom about 12" x 12" and side walls about 4" high. This provides a layer of material about ½" thick which is adequate upon expansion to produce a 2" thick slab of finished expanded material. The mass is preheated, fired, stabilized, cooled, and annealed as in Example I.

The product produced was white and had a density in the order of 20 pounds per cubic foot, and its crushing strength and other physical strength properties were higher than those of the product of Example I.

From the foregoing examples, and the discussion above, it will be clear that the mixture of sodium nitrate and sodium hydroxide reduces to a substantial degree the softening range of the glass and provides at the same time for efficient gas evolution at such lowered temperatures. By using this combination fluxing and gassing agent, relatively small amounts may be incorporated into the glass and excellent expansions attained. Where leaching of alkali from the finished product is a factor of importance, as in thermal insulation materials exposed to moisture, it is desirable to keep the alkali addition to the glass as low as possible.

Care must be exercised, of course, to insure that adequate gas evolution is effected within the desired softening temperature range of the glass; for, if the gas is released before the glass has softened adequately, the glass mass will be tough, and inadequate expansion will occur. On the other hand, if the gas is not liberated until the mass has passed beyond the desired softened condition, the cells or pores will not form or will if formed collapse and form into large bubbles or blisters instead of fine, uniform pores.

The proportioning of the fluxing and gassing agent to glass will vary, of course, with the density desired in the final product, the volume of gas evolved from the selected mixture at the firing temperature employed, the proportioning of sodium nitrate to sodium hydroxide, the kind of glass used, the firing temperature and cycle and other variable factors. As a general rule, from about 2% to 20% of fluxing and gassing agent, based on Na$_2$O yield will be adequate, such proportioning being based on the weight of the glass. The preferred proportioning is in the range of a 2% to 10% addition as in the specific examples. The process can be tailored to obtain the desired cell formation with the particular total alkali content in the mixture by adjustment of the firing temperature and by changing the proportioning of sodium nitrate to sodium hydroxide in the mixture.

Determination of Na$_2$O yield may be made as follows: The Na$_2$O yield from sodium hydroxide is 1:2 on a mol basis, as noted in the equation given above, where to provide one mol of Na$_2$O, 2 mols of NaOH are required (2NaOH→Na$_2$O+H$_2$O). Sodium oxide (Na$_2$O) has a molecular weight of 62; sodium hydroxide (NaOH) has a molecular weight of 40. Since two mols of sodium hydroxide are required to yield one mol of sodium oxide, on a weight basis 80 parts of sodium hydroxide yield 62 parts of sodium oxide. Thus, to determine the yield of sodium oxide from sodium hydroxide, the weight of the sodium hydroxide is multiplied by the molecular weight ratio of sodium oxide over sodium hydroxide. This is represented as follows:

$$\text{Weight of NaOH} \times \frac{62}{2(40)} = \text{weight of Na}_2\text{O}$$

The Na$_2$O yield from sodium nitrate, molecular weight 85, considering the molecular weight difference as in connection with sodium hydroxide discussed above, will be as follows: The Na$_2$O yield from sodium nitrate is also 1:2 on a mol basis (2NaNO$_3$→Na$_2$O+2NO$_2$+O$_2$). Sodium nitrate (NaNO$_3$) has a molecular weight of 85. To determine the yield of Na$_2$O from sodium nitrate, the weight of the sodium nitrate is multiplied by the molecular weight ratio of sodium oxide over sodium nitrate and this is represented as follows:

$$\text{Weight of NaNO}_3 \times \frac{62}{2(85)} = \text{weight of Na}_2\text{O}$$

The proportioning of the sodium nitrate-sodium hydroxide mixture to powdered glass ideally should be such that the desired softening of the glass is obtained at the temperature of most effective gas release for cell formation, and the degree of foaming or cellulation which affects the density may be controlled by discontinuing firing after a product of the desired density has been produced.

The proportioning of the sodium nitrate to sodium hydroxide may be varied depending upon the nature of the product desired, such as density, pore size, pore distribution, and the like, the glass used in the batch, the firing temperature, the firing cycle, limitations of the firing kiln or oven, and other variable factors. It appears from work which has been accomplished that the greatest degree of expansion for any alkali addition (Na$_2$O) is obtained where the mol ratio is 1:1 or 2:1 sodium hydroxide to sodium nitrate where, as noted above, specific chemical compounds are formed upon fusing sodium hydroxide and sodium nitrate. On a mol percent basis, this represents 50 mol percent sodium nitrate to 50 mol percent sodium hydroxide and 33⅓ mol percent sodium nitrate to 66⅔ mol percent sodium hydroxide. There should be at least 2 mol percent of sodium nitrate in the mixture and not more than about 98 mol percent.

Sodium nitrate appears to have more effect on gas production than sodium hydroxide, but the sodium hydroxide appears to have more effect on fluxing of the glass. Thus, as the ratio of sodium nitrate to sodium hydroxide is increased in the fluxing and gasing agent, more gas is evolved but at the same time less fluxing is effected and trapping of the liberated gas becomes less efficient. This factor must be taken into consideration in determining proportioning of the sodium nitrate and sodium hydroxide in the fluxing and gasing agent for use in the manufacture of any particular type of porous or cellular product.

The firing temperature employed will vary with the glass used, the proportioning of sodium nitrate to sodium hydroxide, as noted above, the density, pore size, and other physical characteristics desired in the finished product, and the size and thickness of the mass of batch material to be expanded, the firing cycle, and other variable factors. Generally, a firing temperature in the range of about 1300° F. to about 2000° F. is adequate. Preferred practice is to fire in the range of 1300° F. to 1600° F., principally because of the excessive costs involved in equipment to withstand higher temperatures and the power or fuel requirements to fire at higher temperatures. As noted above, the mass to be fired also may be tailored to suit the firing conditions and, therefore, the upper limit essentially is one of commercial practicability.

Products of various densities may be formed in accordance with the practice of the present invention. Products with extremely fine pores or cells and minor expansions but high physical strength characteristics can be produced. Also, products with larger pores or cells, and a substantial degree of expansion and consequent lower density may be formed. Generally, a density in the order of 30 pounds per cubic foot on the upper side of the range down to 7 pounds per cubic foot will be satisfactory for most products fabricated from the blocks or other shapes made in accordance with the practice of the invention. For most thermal and sound absorbing insulation materials, the density should be in the lower portion of the range, in the order of 7 to 15 pounds per cubic foot.

Recent work has indicated that by proper control of: the proportioning of the fluxing and gasing agent to the glass, the mol ratio of $NaNO_3$ to $NaOH$, and the firing temperature and time, it is possible to satisfactorily control the size of the pores or cells and the general pore or cell structure. This makes it possible to produce sound absorbing insulation with an essentially intercommunicating pore or cell structure and a low temperature thermal insulation with an essentially closed cell structure as well as other products falling intermediately a closed cell and open porous structure. The term cellular is used to include all of the various degrees of closed to open cell structure.

This application is a continuation-in-part of my co-pending application Serial No. 477,106, filed December 22, 1954, now abandoned.

I claim:

1. In a method of making a cellular glass product, the steps comprising mixing together to form a batch, finely divided glass selected from the group consisting of fused soda-lime glass, fused borosilicate glass, and mixtures thereof, and as a fluxing and gasing agent a mixture of sodium nitrate and sodium hydroxide in the proportion of about a 2% to about a 20% addition of said fluxing and gasing agent to said glass, based on the $Na_2O$ yield of the fluxing and gasing agent, said sodium nitrate being present in said mixture to the extent of between about 2 mol percent and 98 mol percent; firing said batch within a temperature range of about 1300° F. to about 2000° F. to form a softened mass and to liberate gas into the softened mass to form cells therein; continuing the firing until the gas released into said softened mass produces a foamed and substantially expanded cellular product; and then annealing the product.

2. In a method of making a cellular glass product in accordance with claim 1, the improvement which comprises adding said fluxing and gasing agent in the proportion of about a 2% to about a 10% addition of said fluxing and gasing agent to said glass, based on the $Na_2O$ yield of the fluxing and gasing agent.

3. In a method of making a cellular glass product in accordance with claim 1, the improvement which comprises firing said batch within a temperature range of about 1300° F. to about 1600° F.

4. In a method of making a cellular glass product in accordance with claim 1, the improvement which comprises adding said mixture of sodium nitrate and sodium hydroxide in a mol ratio of about 1:1 sodium nitrate to sodium hydroxide.

5. In a method of making a cellular glass product in accordance with claim 1, the improvement which comprises adding said mixture of sodium nitrate and sodium hydroxide in a mol ratio of about 1:2 sodium nitrate to sodium hydroxide.

6. In a method of making a cellular glass product in accordance with claim 1, the improvement which comprises adding said fluxing and gasing agent in the proportion of about a 2% to about a 10% addition of said fluxing and gasing agent to said glass, based on the $Na_2O$ yield of the fluxing and gasing agent, and firing said batch within a temperature range of about 1300° F. to about 1600° F.

References Cited in the file of this patent

UNITED STATES PATENTS

| | | |
|---|---|---|
| 2,102,630 | Kreidl | Dec. 21, 1937 |
| 2,191,658 | Haux | Feb. 27, 1940 |
| 2,209,163 | Kaloustian | July 23, 1940 |
| 2,209,170 | Nevin et al. | July 23, 1940 |
| 2,514,324 | Ford | July 4, 1950 |